United States Patent
Ali et al.

(10) Patent No.: US 11,953,615 B2
(45) Date of Patent: Apr. 9, 2024

(54) METHOD AND SYSTEM FOR ANTENNA ARRAY CALIBRATION FOR CROSS-COUPLING AND GAIN/PHASE VARIATIONS IN RADAR SYSTEMS

(71) Applicant: UHNDER, INC., Austin, TX (US)

(72) Inventors: Murtaza Ali, Cedar Park, TX (US); Ali Erdem Ertan, Austin, TX (US); Kevin B. Foltinek, Austin, TX (US)

(73) Assignee: Uhnder Inc., Austin, TX (US)

( * ) Notice: Subject to any disclaimer, the term of this patent is extended or adjusted under 35 U.S.C. 154(b) by 533 days.

(21) Appl. No.: 17/147,914

(22) Filed: Jan. 13, 2021

(65) Prior Publication Data

US 2021/0215793 A1    Jul. 15, 2021

Related U.S. Application Data

(60) Provisional application No. 62/960,220, filed on Jan. 13, 2020.

(51) Int. Cl.
*G01S 7/40* (2006.01)
*G01S 7/02* (2006.01)
(Continued)

(52) U.S. Cl.
CPC .............. *G01S 7/352* (2013.01); *G01S 7/023* (2013.01); *G01S 7/4004* (2013.01); *G01S 13/34* (2013.01);
(Continued)

(58) Field of Classification Search
CPC ........ G01S 7/352; G01S 7/023; G01S 7/4004; G01S 13/34; G01S 13/584; G01S 13/588;
(Continued)

(56) References Cited

U.S. PATENT DOCUMENTS

| | | |
|---|---|---|
| 1,882,128 A | 10/1932 | Fearing |
| 3,374,478 A | 3/1968 | Blau |

(Continued)

FOREIGN PATENT DOCUMENTS

| | | |
|---|---|---|
| EP | 0509843 | 10/1992 |
| EP | 1826586 | 8/2007 |

(Continued)

OTHER PUBLICATIONS

Chambers et al., "An article entitled Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Timothy A Brainard
*Assistant Examiner* — Ismaaeel A. Siddiquee
(74) *Attorney, Agent, or Firm* — Gardner, Linn, Burkhart & Ondersma LLP

(57) ABSTRACT

A radar system with on-system calibration for cross-coupling and gain/phase variations includes capabilities for radar detection and correction for system impairments to improve detection performance. The radar system is equipped with pluralities of transmit antennas and pluralities of receive antennas. The radar system uses a series of calibration measurements of a known object to estimate the system impairments. A correction is then applied to the beamforming weights to mitigate the effect of these impairments on radar detection. The estimation and correction requires no external measurement equipment and can be computed on the radar system itself.

20 Claims, 10 Drawing Sheets

(51) Int. Cl.

| | | |
|---|---|---|
| *G01S 7/35* | (2006.01) | |
| *G01S 13/34* | (2006.01) | |
| *G01S 13/58* | (2006.01) | |
| *G01S 13/931* | (2020.01) | |
| *H01Q 3/26* | (2006.01) | |
| *G01S 7/28* | (2006.01) | |
| *G01S 7/32* | (2006.01) | |
| *G01S 13/36* | (2006.01) | |
| *G01S 13/42* | (2006.01) | |
| *G01S 13/87* | (2006.01) | |

(52) U.S. Cl.
CPC .......... *G01S 13/584* (2013.01); *G01S 13/588* (2013.01); *G01S 13/931* (2013.01); *H01Q 3/267* (2013.01); *G01S 7/28* (2013.01); *G01S 7/32* (2013.01); *G01S 7/356* (2021.05); *G01S 13/36* (2013.01); *G01S 13/42* (2013.01); *G01S 13/878* (2013.01); *G01S 2013/93271* (2020.01); *G01S 2013/93272* (2020.01)

(58) Field of Classification Search
CPC ........ G01S 13/931; G01S 7/356; G01S 13/42; G01S 13/36; G01S 7/032; G01S 2013/93271; G01S 2013/93272; G01S 13/878; G01S 7/028; H01Q 3/267
See application file for complete search history.

(56) References Cited

U.S. PATENT DOCUMENTS

| | | |
|---|---|---|
| 3,735,398 A | 5/1973 | Ross |
| 3,750,169 A | 7/1973 | Strenglein |
| 3,766,554 A | 10/1973 | Tresselt |
| 3,896,434 A | 7/1975 | Sirven |
| 3,932,871 A | 1/1976 | Foote |
| 4,078,234 A | 3/1978 | Fishbein et al. |
| 4,176,351 A | 11/1979 | De Vita et al. |
| 4,308,536 A | 12/1981 | Sims, Jr. et al. |
| 4,566,010 A | 1/1986 | Collins |
| 4,612,547 A | 9/1986 | Itoh |
| 4,882,668 A | 11/1989 | Schmid et al. |
| 4,910,464 A | 3/1990 | Trett et al. |
| 4,939,685 A | 7/1990 | Feintuch |
| 5,001,486 A | 3/1991 | Bächtiger |
| 5,012,254 A | 4/1991 | Thompson |
| 5,034,906 A | 7/1991 | Chang |
| 5,087,918 A | 2/1992 | May et al. |
| 5,140,331 A * | 8/1992 | Aulenbacher ......... G01S 7/4004 342/192 |
| 5,151,702 A | 9/1992 | Urkowitz |
| 5,175,710 A | 12/1992 | Hutson |
| 5,218,619 A | 6/1993 | Dent |
| 5,272,663 A | 12/1993 | Jones et al. |
| 5,280,288 A | 1/1994 | Sherry et al. |
| 5,302,956 A | 4/1994 | Asbury et al. |
| 5,341,141 A | 8/1994 | Frazier et al. |
| 5,345,470 A | 9/1994 | Alexander |
| 5,361,072 A | 11/1994 | Barrick et al. |
| 5,376,939 A | 12/1994 | Urkowitz |
| 5,379,322 A | 1/1995 | Kosaka et al. |
| 5,497,162 A | 3/1996 | Kaiser |
| 5,508,706 A | 4/1996 | Tsou et al. |
| 5,581,464 A | 12/1996 | Woll et al. |
| 5,654,715 A | 8/1997 | Hayashikura et al. |
| 5,657,021 A | 8/1997 | Ehsani-Nategh et al. |
| 5,657,023 A | 8/1997 | Lewis et al. |
| 5,691,724 A | 11/1997 | Aker et al. |
| 5,712,640 A | 1/1998 | Andou |
| 5,724,041 A | 3/1998 | Inoue et al. |
| 5,847,661 A | 12/1998 | Ricci |
| 5,892,477 A | 4/1999 | Wehling |
| 5,917,430 A | 6/1999 | Greneker, III et al. |
| 5,920,285 A | 7/1999 | Benjamin |
| 5,931,893 A | 8/1999 | Dent et al. |
| 5,959,571 A | 9/1999 | Aoyagi et al. |
| 5,970,400 A | 10/1999 | Dwyer |
| 6,048,315 A | 4/2000 | Chiao et al. |
| 6,067,314 A | 5/2000 | Azuma |
| 6,069,581 A | 5/2000 | Bell et al. |
| 6,121,872 A | 9/2000 | Weishaupt |
| 6,121,918 A | 9/2000 | Tullsson |
| 6,151,366 A | 11/2000 | Yip |
| 6,163,252 A | 12/2000 | Nishiwaki |
| 6,184,829 B1 | 2/2001 | Stilp |
| 6,191,726 B1 | 2/2001 | Tullsson |
| 6,208,248 B1 | 3/2001 | Ross |
| 6,288,672 B1 | 9/2001 | Asano et al. |
| 6,307,622 B1 | 10/2001 | Lewis |
| 6,335,700 B1 | 1/2002 | Ashihara |
| 6,347,264 B2 | 2/2002 | Nicosia et al. |
| 6,400,308 B1 | 6/2002 | Bell et al. |
| 6,411,250 B1 | 6/2002 | Oswald et al. |
| 6,417,796 B1 | 7/2002 | Bowlds |
| 6,424,289 B2 | 7/2002 | Fukae et al. |
| 6,547,733 B2 | 4/2003 | Hwang et al. |
| 6,583,753 B1 | 6/2003 | Reed |
| 6,614,387 B1 | 9/2003 | Deadman |
| 6,624,784 B1 | 9/2003 | Yamaguchi |
| 6,674,908 B1 | 1/2004 | Aronov |
| 6,683,560 B2 | 1/2004 | Bauhahn |
| 6,693,582 B2 | 2/2004 | Steinlechner et al. |
| 6,714,956 B1 | 3/2004 | Liu et al. |
| 6,747,595 B2 | 6/2004 | Hirabe |
| 6,768,391 B1 | 7/2004 | Dent et al. |
| 6,865,218 B1 | 3/2005 | Sourour |
| 6,888,491 B2 | 5/2005 | Richter |
| 6,975,246 B1 | 12/2005 | Trudeau |
| 7,066,886 B2 | 6/2006 | Song et al. |
| 7,119,739 B1 | 10/2006 | Struckman |
| 7,130,663 B2 | 10/2006 | Guo |
| 7,202,776 B2 | 4/2007 | Breed |
| 7,289,058 B2 | 10/2007 | Shima |
| 7,299,251 B2 | 11/2007 | Skidmore et al. |
| 7,338,450 B2 | 3/2008 | Kristofferson et al. |
| 7,395,084 B2 | 7/2008 | Anttila |
| 7,460,055 B2 | 12/2008 | Nishijima et al. |
| 7,474,258 B1 | 1/2009 | Arikan et al. |
| 7,545,310 B2 | 6/2009 | Matsuoka |
| 7,545,321 B2 | 6/2009 | Kawasaki |
| 7,564,400 B2 | 7/2009 | Fukuda |
| 7,567,204 B2 | 7/2009 | Sakamoto |
| 7,609,198 B2 | 10/2009 | Chang |
| 7,642,952 B2 | 1/2010 | Fukuda |
| 7,663,533 B2 | 2/2010 | Toennesen |
| 7,667,637 B2 | 2/2010 | Pedersen et al. |
| 7,728,762 B2 | 6/2010 | Sakamoto |
| 7,791,528 B2 | 9/2010 | Klotzbuecher |
| 7,847,731 B2 | 12/2010 | Wiesbeck et al. |
| 7,855,677 B2 | 12/2010 | Negoro et al. |
| 7,859,450 B2 | 12/2010 | Shirakawa et al. |
| 8,019,352 B2 | 9/2011 | Rappaport et al. |
| 8,044,845 B2 | 10/2011 | Saunders |
| 8,049,663 B2 | 11/2011 | Frank et al. |
| 8,059,026 B1 | 11/2011 | Nunez |
| 8,102,306 B2 | 1/2012 | Smith, Jr. et al. |
| 8,115,672 B2 | 2/2012 | Nouvel et al. |
| 8,154,436 B2 | 4/2012 | Szajnowski |
| 8,169,359 B2 | 5/2012 | Aoyagi |
| 8,212,713 B2 | 7/2012 | Aiga et al. |
| 8,330,650 B2 | 12/2012 | Goldman |
| 8,390,507 B2 | 3/2013 | Wintermantel |
| 8,471,760 B2 | 6/2013 | Szajnowski |
| 8,532,159 B2 | 9/2013 | Kagawa et al. |
| 8,547,988 B2 | 10/2013 | Hadani et al. |
| 8,686,894 B2 | 4/2014 | Fukuda et al. |
| 8,694,306 B1 | 4/2014 | Short et al. |
| 8,994,581 B1 | 3/2015 | Brown |
| 9,121,943 B2 | 9/2015 | Stirlin-Gallacher et al. |
| 9,239,378 B2 | 1/2016 | Kishigami et al. |
| 9,239,379 B2 | 1/2016 | Burgio et al. |
| 9,274,217 B2 | 3/2016 | Chang et al. |
| 9,282,945 B2 | 3/2016 | Smith et al. |

(56) References Cited

U.S. PATENT DOCUMENTS

| | | |
|---|---|---|
| 9,335,402 B2 | 5/2016 | Maeno et al. |
| 9,400,328 B2 | 7/2016 | Hsiao et al. |
| 9,541,639 B2 | 1/2017 | Searcy et al. |
| 9,568,600 B2 | 2/2017 | Alland |
| 9,575,160 B1 | 2/2017 | Davis et al. |
| 9,599,702 B1 | 3/2017 | Bordes et al. |
| 9,689,967 B1 | 6/2017 | Stark et al. |
| 9,720,073 B1 | 8/2017 | Davis et al. |
| 9,720,080 B1 | 9/2017 | Rodenbeck |
| 9,753,121 B1 | 9/2017 | Davis |
| 9,753,132 B1 | 9/2017 | Bordes et al. |
| 9,772,397 B1 | 9/2017 | Bordes et al. |
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 10,092,192 B2 | 10/2018 | Lashkari et al. |
| 10,690,780 B1 * | 6/2020 | Zarubica .............. G01S 19/32 |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0070532 A1 | 4/2004 | Ishii et al. |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2005/0008065 A1 | 1/2005 | Schilling |
| 2005/0069162 A1 | 3/2005 | Haykin |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 | 10/2006 | Schlick et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0080599 A1 | 4/2008 | Kange et al. |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1 | 5/2009 | Shirai et al. |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0039311 A1 | 2/2010 | Woodington et al. |
| 2010/0116365 A1 | 5/2010 | McCarty |
| 2010/0156690 A1 | 6/2010 | Kim et al. |
| 2010/0198513 A1 | 8/2010 | Zeng et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1 | 12/2011 | Hadani et al. |
| 2011/0298653 A1 | 12/2011 | Mizutani |
| 2012/0001791 A1 | 1/2012 | Wintermantel |
| 2012/0050092 A1 | 3/2012 | Lee et al. |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1 | 6/2012 | Karr |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0283987 A1 | 11/2012 | Busking et al. |
| 2012/0314799 A1 | 12/2012 | In De Betou et al. |
| 2012/0319900 A1 | 12/2012 | Johansson et al. |
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1 | 4/2013 | Cyzs |
| 2013/0113647 A1 | 5/2013 | Sentelle et al. |
| 2013/0113652 A1 | 5/2013 | Smits et al. |
| 2013/0113653 A1 | 5/2013 | Kishigami et al. |

(56) References Cited

U.S. PATENT DOCUMENTS

| | | | |
|---|---|---|---|
| 2013/0129253 A1* | 5/2013 | Moate | G06T 3/0068 382/278 |
| 2013/0135140 A1 | 5/2013 | Kishigami | |
| 2013/0169468 A1 | 7/2013 | Johnson et al. | |
| 2013/0169485 A1 | 7/2013 | Lynch | |
| 2013/0176154 A1 | 7/2013 | Bonaccio et al. | |
| 2013/0214961 A1 | 8/2013 | Lee et al. | |
| 2013/0229301 A1 | 9/2013 | Kanamoto | |
| 2013/0244710 A1 | 9/2013 | Nguyen et al. | |
| 2013/0249730 A1 | 9/2013 | Adcook | |
| 2013/0314271 A1 | 11/2013 | Braswell et al. | |
| 2013/0321196 A1 | 12/2013 | Binzer et al. | |
| 2014/0022108 A1 | 1/2014 | Alberth, Jr. et al. | |
| 2014/0028491 A1 | 1/2014 | Ferguson | |
| 2014/0035774 A1 | 2/2014 | Khlifi | |
| 2014/0049423 A1 | 2/2014 | De Jong et al. | |
| 2014/0070985 A1 | 3/2014 | Vacanti | |
| 2014/0085128 A1 | 3/2014 | Kishigami et al. | |
| 2014/0097987 A1 | 4/2014 | Worl et al. | |
| 2014/0111367 A1 | 4/2014 | Kishigami et al. | |
| 2014/0111372 A1 | 4/2014 | Wu | |
| 2014/0139322 A1 | 5/2014 | Wang et al. | |
| 2014/0159948 A1 | 6/2014 | Ishimori et al. | |
| 2014/0220903 A1 | 8/2014 | Schulz et al. | |
| 2014/0253345 A1 | 9/2014 | Breed | |
| 2014/0253364 A1 | 9/2014 | Lee et al. | |
| 2014/0285373 A1 | 9/2014 | Kuwahara et al. | |
| 2014/0316261 A1 | 10/2014 | Lux et al. | |
| 2014/0327566 A1 | 11/2014 | Burgio et al. | |
| 2014/0340254 A1 | 11/2014 | Hesse | |
| 2014/0348253 A1 | 11/2014 | Mobasher et al. | |
| 2014/0350815 A1 | 11/2014 | Kambe | |
| 2015/0002329 A1 | 1/2015 | Murad et al. | |
| 2015/0002357 A1 | 1/2015 | Sanford et al. | |
| 2015/0035662 A1 | 2/2015 | Bowers et al. | |
| 2015/0061922 A1 | 3/2015 | Kishigami | |
| 2015/0103745 A1 | 4/2015 | Negus et al. | |
| 2015/0153445 A1 | 6/2015 | Jansen | |
| 2015/0160335 A1 | 6/2015 | Lynch et al. | |
| 2015/0198709 A1 | 7/2015 | Inoue | |
| 2015/0204966 A1 | 7/2015 | Kishigami | |
| 2015/0204971 A1 | 7/2015 | Yoshimura et al. | |
| 2015/0204972 A1 | 7/2015 | Kuehnle et al. | |
| 2015/0226848 A1 | 8/2015 | Park | |
| 2015/0234045 A1 | 8/2015 | Rosenblum | |
| 2015/0247924 A1 | 9/2015 | Kishigami | |
| 2015/0255867 A1 | 9/2015 | Inoue | |
| 2015/0301172 A1 | 10/2015 | Ossowska | |
| 2015/0323660 A1 | 11/2015 | Hampikian | |
| 2015/0331090 A1 | 11/2015 | Jeong et al. | |
| 2015/0369912 A1 | 12/2015 | Kishigami et al. | |
| 2016/0003938 A1 | 1/2016 | Gazit et al. | |
| 2016/0003939 A1 | 1/2016 | Stainvas Olshansky et al. | |
| 2016/0018511 A1 | 1/2016 | Nayyar et al. | |
| 2016/0025844 A1 | 1/2016 | Mckitterick et al. | |
| 2016/0033631 A1 | 2/2016 | Searcy et al. | |
| 2016/0033632 A1 | 2/2016 | Searcy et al. | |
| 2016/0041260 A1 | 2/2016 | Cao et al. | |
| 2016/0054441 A1 | 2/2016 | Kuo et al. | |
| 2016/0061935 A1 | 3/2016 | McCloskey et al. | |
| 2016/0084941 A1 | 3/2016 | Arage | |
| 2016/0084943 A1 | 3/2016 | Arage | |
| 2016/0091595 A1 | 3/2016 | Alcalde | |
| 2016/0103206 A1 | 4/2016 | Pavao-Moreira et al. | |
| 2016/0124075 A1 | 5/2016 | Vogt et al. | |
| 2016/0124086 A1 | 5/2016 | Jansen et al. | |
| 2016/0131752 A1 | 5/2016 | Jansen et al. | |
| 2016/0139254 A1 | 5/2016 | Wittenberg | |
| 2016/0146931 A1 | 5/2016 | Rao et al. | |
| 2016/0154103 A1 | 6/2016 | Moriuchi | |
| 2016/0178732 A1 | 6/2016 | Oka et al. | |
| 2016/0213258 A1 | 7/2016 | Lashkari et al. | |
| 2016/0223644 A1 | 8/2016 | Soga | |
| 2016/0238694 A1 | 8/2016 | Kishigami | |
| 2016/0349365 A1 | 12/2016 | Ling | |
| 2017/0010361 A1 | 1/2017 | Tanaka | |
| 2017/0023661 A1 | 1/2017 | Richert | |
| 2017/0023663 A1 | 1/2017 | Subburaj et al. | |
| 2017/0074980 A1 | 3/2017 | Adib | |
| 2017/0090015 A1 | 3/2017 | Breen et al. | |
| 2017/0117946 A1* | 4/2017 | Lee | G01S 3/72 |
| 2017/0117950 A1 | 4/2017 | Strong | |
| 2017/0153316 A1 | 6/2017 | Wintermantel | |
| 2017/0212213 A1 | 7/2017 | Kishigami | |
| 2017/0219689 A1 | 8/2017 | Hung et al. | |
| 2017/0234968 A1 | 8/2017 | Roger et al. | |
| 2017/0293025 A1 | 10/2017 | Davis et al. | |
| 2017/0293027 A1 | 10/2017 | Stark et al. | |
| 2017/0307728 A1 | 10/2017 | Eshraghi et al. | |
| 2017/0309997 A1 | 10/2017 | Alland et al. | |
| 2017/0310758 A1* | 10/2017 | Davis | G01S 13/931 |
| 2017/0336495 A1 | 11/2017 | Davis et al. | |
| 2018/0003799 A1 | 1/2018 | Yang et al. | |
| 2018/0019755 A1 | 1/2018 | Josefsberg et al. | |
| 2018/0175907 A1 | 1/2018 | Marr | |
| 2018/0074168 A1 | 3/2018 | Subburaj et al. | |
| 2018/0095163 A1 | 4/2018 | Lovberg et al. | |
| 2018/0149730 A1 | 5/2018 | Li et al. | |
| 2018/0294564 A1* | 10/2018 | Kim | H01Q 3/2652 |
| 2019/0013566 A1* | 1/2019 | Merrell | H01Q 1/1257 |
| 2020/0014105 A1* | 1/2020 | Braun | H01Q 3/267 |
| 2020/0033445 A1* | 1/2020 | Raphaeli | G01S 13/003 |
| 2020/0064455 A1 | 2/2020 | Schroder et al. | |

FOREIGN PATENT DOCUMENTS

| | | |
|---|---|---|
| EP | 0725480 | 11/2011 |
| EP | 2374217 | 4/2013 |
| EP | 2884299 | 6/2015 |
| EP | 2821808 | 7/2015 |
| FR | 2751086 | 1/1998 |
| WO | WO2008022981 | 2/2008 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017059961 | 4/2017 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014. (Year: 2014).

Óscar Faus García, "Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

* cited by examiner

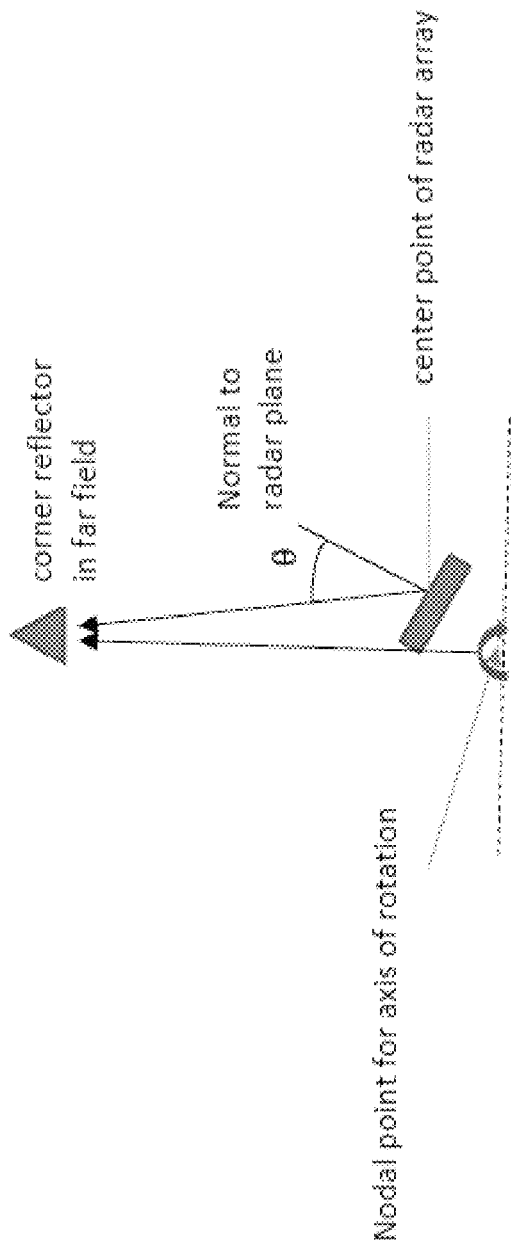

Calibration System – Radar Only

When nodal point for axis of rotation does not match the radar array center

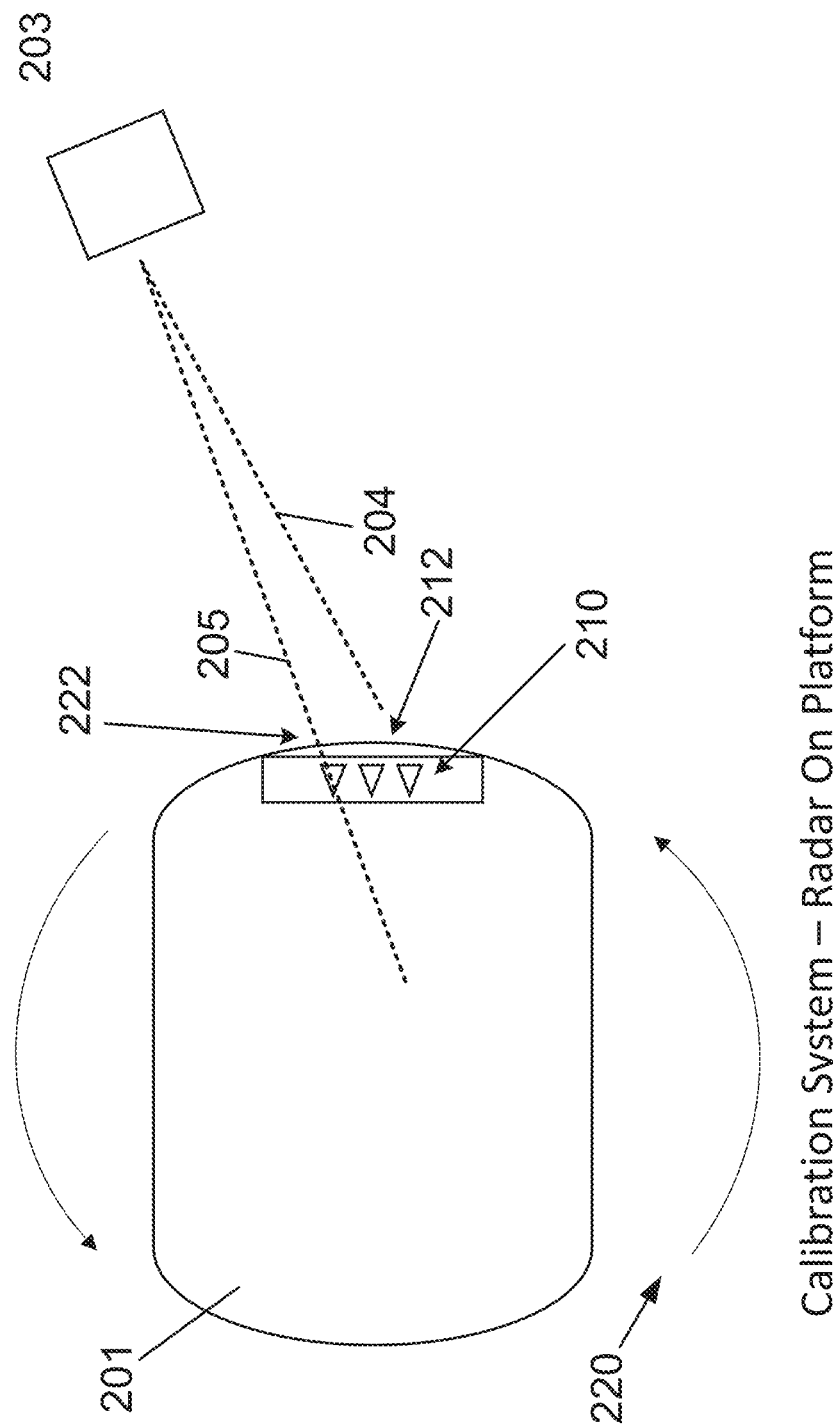

Cross Coupling

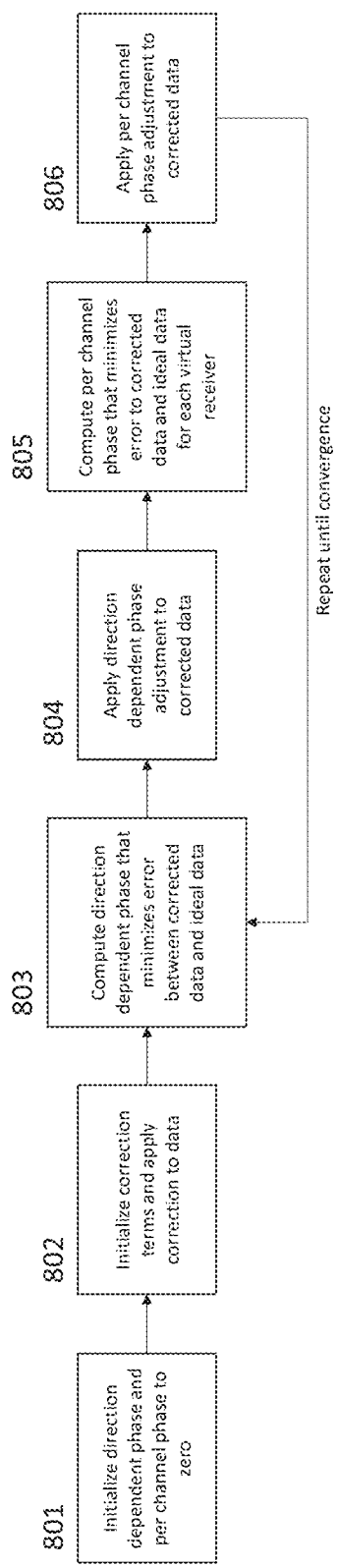
FIG. 8: Phase Correction
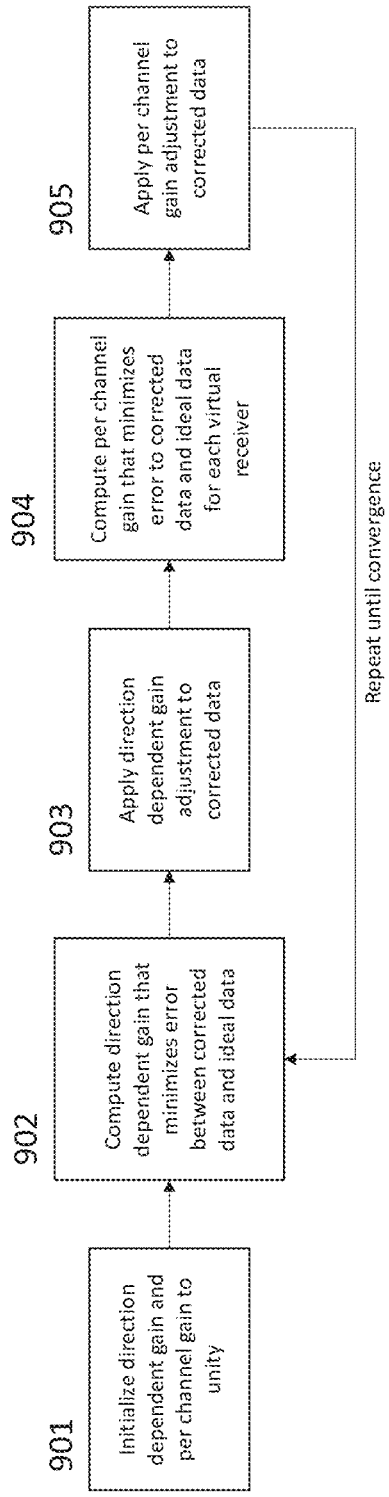
FIG. 9: Gain Correction

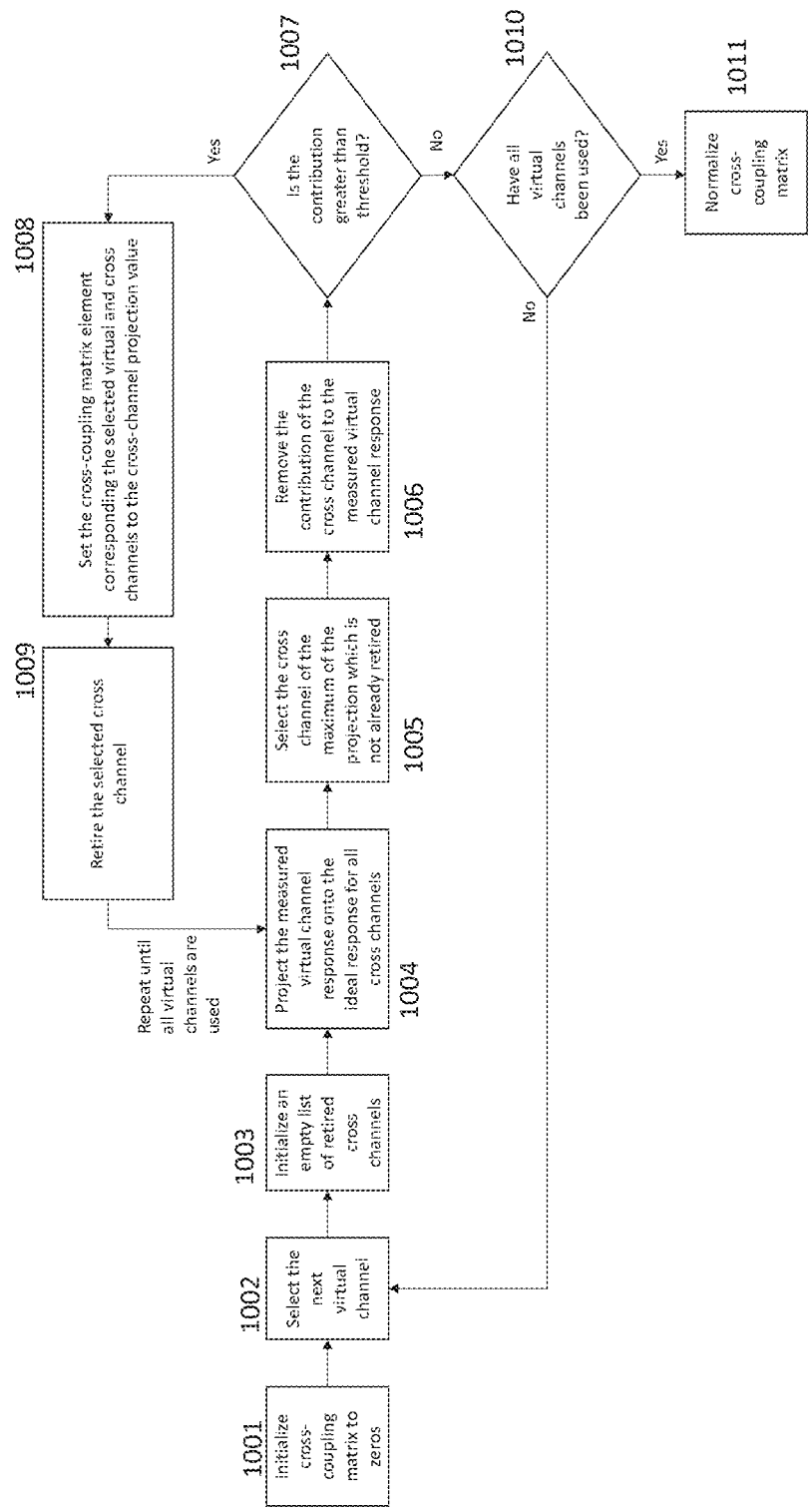
FIG. 10: Cross-Coupling Correction

METHOD AND SYSTEM FOR ANTENNA ARRAY CALIBRATION FOR CROSS-COUPLING AND GAIN/PHASE VARIATIONS IN RADAR SYSTEMS

CROSS REFERENCE TO RELATED APPLICATION

The present application claims the filing benefits of U.S. provisional application, Ser. No. 62/960,220, filed Jan. 13, 2020, which is hereby incorporated by reference herein in its entirety.

The present invention is directed to radar systems, and more particularly to radar systems for vehicles and robotics.

BACKGROUND OF THE INVENTION

The use of radar to determine location, range, and velocity of objects in an environment is important in a number of applications including automotive radar, industrial processes, robotic sensing, gesture detection, and positioning. A radar system typically transmits radio signals and listens for the reflection of the radio signals from objects in the environment. By comparing the transmitted radio signals with the received radio signals, a radar system can determine the distance to an object, and the velocity of the object. Using multiple transmitters and/or receivers, or a movable transmitter or receiver, the location (angle) of an object can also be determined. Therefore, radar systems require accurate operation to maintain their optimal performance.

SUMMARY OF THE INVENTION

Embodiments of the present invention provide for a radar calibration system that calibrates for radar system impairments using a series of radar data measurements. Such impairments include coupling effects, per channel gain and phase variations, and direction dependent gain and phase variations. This calibration system operates under a variety of environments, with a variety of external information, and with a variety of objective functions to modify the measurement collection as well as the calibration processing to optimize the system with respect to a given objective function.

In an aspect of the present invention, a radar system for a robot or vehicle that calibrates for system impairments includes a radar system with at least one transmitter and at least one receiver. The transmitter and receiver are connected to at least one antenna. The transmitter is configured to transmit radio signals. The receiver is configured to receive a radio signal that includes the transmitted radio signal transmitter by the transmitter and reflected from objects in the environment. The receiver is also configured to receive radio signals transmitted by other radar systems.

In an aspect of the present invention, the radar system comprises one of: a single transmitter and a plurality of receivers; a plurality of transmitters and a single receiver; and a plurality of transmitters and a plurality of receivers.

In a further aspect of the present invention, the transmitters and receivers may be connected to multiple antennas through a switch.

In another aspect of the present invention, the radar system includes a calibration module that is configured to rotate its direction in both azimuth and elevation. In the presence of at least one reflecting object, the calibration module collects reflected signals from the at least one reflecting object at desired angles of interest in the azimuth and elevation space. This rotation may occur in either a continuous manner or a discrete "stop-and-go" manner. The radar system's center point of the antenna array does not need to align with the center point of rotation, and the radar system corrects for phase distortion and angle-of-arrival error due to this misalignment. This misalignment is referred to as nodal displacement. The calibration module then processes these measurements into a correction matrix, which calibrates for radar system impairments. These may include phase error due to nodal displacement, per channel phase variation, direction dependent phase variation, per channel amplitude variation, direction dependent amplitude variation, and channel response cross coupling. The angles-of-arrival of the collected reflected signals may be either estimated by the radar system or determined through prior knowledge of the object(s) location(s) relative to the radar system.

In another aspect of the present invention, the radar system may modify its measurement collection and calibration processing to optimize different objective functions. These modifications include the speed and manner of rotation, quantity of measurements collected, and the selection of antenna(s) and channel(s) transmitting and receiving the signal(s). These modifications also include parameters in the processing that control the computation of the correction matrix and affect the processing speed and correction accuracy.

In another aspect of the present invention, a method for calibrating a radar system for system impairments includes at least one transmitter transmitting radio signals. At least one receiver is receiving radio signals that include radio signals transmitted by the transmitter and reflected from objects in an environment. The at least one transmitter and the at least one receiver are coupled to an antenna array. A platform rotating the at least one receiver and the at least one transmitter in both azimuth and elevation. An array center of the antenna array is not aligned with the platform's rotational center. The method includes collecting, with a calibration module, in the in the presence of at least one object, reflected signals from the at least one object at desired angles of interest in azimuth and elevation, calculating a misalignment between the array center of the antenna array and the rotation center of the platform. The method also includes correcting, with the at least one receiver, for phase distortion and angle-of-arrival error due to the calculated misalignment. The misalignment between the array center of the antenna and the rotation center of the platform is a nodal displacement. The array center of the antenna array is a nodal point.

These and other objects, advantages, purposes and features of the present invention will become apparent upon review of the following specification in conjunction with the drawings.

BRIEF DESCRIPTION OF THE DRAWINGS

FIG. 1A is a diagram of a radar system where a nodal point for an axis of rotation does not match a radar array center of the radar system in accordance with the present invention;

FIG. 2 is a diagram of a radar calibration system installed on a maneuverable platform in accordance with the present invention;

FIG. 8 is a flow chart describing the process of estimating direction dependent and per channel phase correction, in accordance with the present invention;

FIG. 9 is a flow chart describing the process of estimating direction dependent and per channel gain correction, in accordance with the present invention; and FIG. 10 is a flow chart describing the process of estimating cross-coupling correction, in accordance with the present invention;

DESCRIPTION OF THE PREFERRED EMBODIMENTS

Figure 1B:
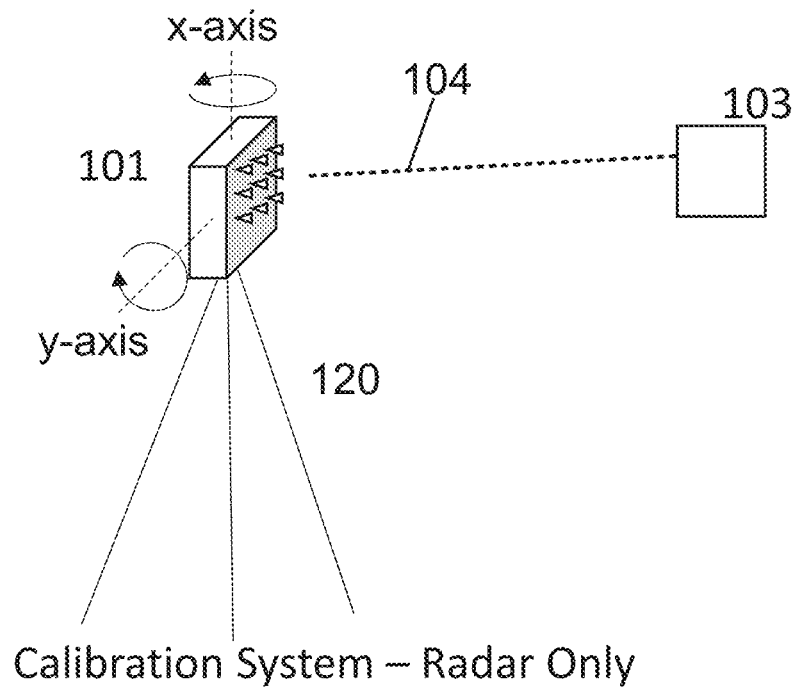
FIG. 1B is a perspective view of a radar calibration system orientated towards a target in accordance with the present invention.

Referring to the drawings and the illustrative embodiments depicted therein, wherein numbered elements in the following written description correspond to like-numbered elements in the figures, a calibration system provides for a calibration of a radar system. The radar system includes a calibration module that includes a platform for rotating receivers and transmitters of the radar system in both azimuth and elevation. An array center of the antenna array is not aligned with the platform's rotational center. The calibration module collects, in the presence of at least one object, reflected signals from the at least one object at desired angles of interest in azimuth and elevation. The calibration module calculates a misalignment between the array center of the antenna array and the rotation center of the platform. The at least one receiver corrects for phase distortion and angle-of-arrival error due to the calculated misalignment. The misalignment between the array center of the antenna and the rotation center of the platform is a nodal displacement. The array center of the antenna array is a nodal point.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is the modulation of signal being transmitted. A first type of continuous wave radar signal is known as a frequency modulated continuous wave (FMCW) radar signal. In an FMCW radar system, the transmitted signal is a sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a sinusoidal signal in which the phase of the sinusoidal signal varies. Typically, the phase during a given time period (called a chip period or chip duration) is one of a finite number of possible phases. A spreading code consisting of a sequence of chips, (e.g., +1, +1, −1, +1, −1 . . . ) is mapped (e.g., +1→0, −1→π) into a sequence of phases (e.g., 0, 0, π, 0, π . . . ) that is used to modulate a carrier to generate the radio frequency (RF) signal. The spreading code could be a periodic sequence or could be a pseudo-random sequence with a very large period so it appears to be a nearly random sequence. The spreading code could be a binary code (e.g., +1 or −1). The resulting signal has a bandwidth that is proportional to the rate at which the phases change, called the chip rate $R_c$, which is the inverse of the chip duration, $T_c=1/R_c$. By comparing the return signal to the transmitted signal, the receiver can determine the range and the velocity of reflected objects.

In some radar systems, the signal (e.g. a PMCW signal) is transmitted over a short time period (e.g. 1 microsecond) and then turned off for a similar time period. The receiver is only turned on during the time period where the transmitter is turned off. In this approach, reflections of the transmitted signal from very close targets will not be completely available because the receiver is not active during a large fraction of the time when the reflected signals are being received. This is called pulse mode.

Digital frequency modulated continuous wave (FMCW) and phase modulated continuous wave (PMCW) are techniques in which a carrier signal is frequency or phase modulated, respectively, with digital codes using, for example, GMSK. Digital FMCW radar lends itself to be constructed in a MIMO variant in which multiple transmitters transmitting multiple codes are received by multiple receivers that decode all codes.

The advantage of the MIMO digital FMCW radar is that the angular resolution is that of a virtual antenna array having an equivalent number of elements equal to the product of the number of transmitters and the number of receivers. Digital FMCW MIMO radar techniques are described in U.S. Pat. Nos. 9,989,627; 9,945,935; 9,846,228; and 9,791,551, which are all hereby incorporated by reference herein in their entireties.

The radar sensing system of the present invention may utilize aspects of the radar systems described in U.S. Pat. Nos. 10,261,179; 9,971,020; 9,954,955; 9,945,935; 9,869,762; 9,846,228; 9,806,914; 9,791,564; 9,791,551; 9,772,397; 9,753,121; 9,689,967; 9,599,702; 9,575,160, and/or 9,689,967, and/or U.S. Publication Nos. US-2017-0309997;

and/or U.S. patent application Ser. No. 16/674,543, filed Nov. 5, 2019, Ser. No. 16/259,474, filed Jan. 28, 2019, Ser. No. 16/220,121, filed Dec. 14, 2018, Ser. No. 15/496,038, filed Apr. 25, 2017, Ser. No. 15/689,273, filed Aug. 29, 2017, Ser. No. 15/893,021, filed Feb. 9, 2018, and/or Ser. No. 15/892,865, filed Feb. 9, 2018, and/or U.S. provisional application, Ser. No. 62/816,941, filed Mar. 12, 2019, which are all hereby incorporated by reference herein in their entireties.

Antenna Calibration:

Determining a correct angle calibration matrix to counter the impact of effective cross-coupling between virtual receivers in large-scale MIMO systems has been challenging. The problem is especially acute when the system is large or cannot be conveniently placed on the rotating measurement system. In some cases, a nodal point cannot be maintained or cannot even be accurately determined. Such cases occur in radars mounted on robots, drones or other devices, or in cases when angle calibration is desired in situ with the whole system assembled. An exemplary method is disclosed that efficiently and correctly determines channel-to-channel variations and cross-coupling coefficients from angle sweep data in the presence of an unknown nodal point of the system. An exemplary algorithm also produces the diagonal calibration values as a by-product.

Typical angle calibration methods require collection of channel response data for a number of angles, which is also called as angle sweep data. The data is collected in an anechoic chamber with a single target in far-field and radar mounted on a gimbal that can be rotated between the angles of interest (up-to ±90 degrees), which allows collecting the target virtual channel response in those angles. A typical data collection system is shown in FIG. 1A. This represents the case where the nodal point for the axis of rotation is the same as the center of the radar antenna system. The radar may have planar antenna array (2-D) instead of a linear antenna array (1-D). The radar will then need to rotate in two axes maintaining the nodal point of rotation in both axes at the center of the planar antenna array. The antenna array can be a virtual array created through the use multi-input multi-output (MIMO) technology.

Figure 1C:
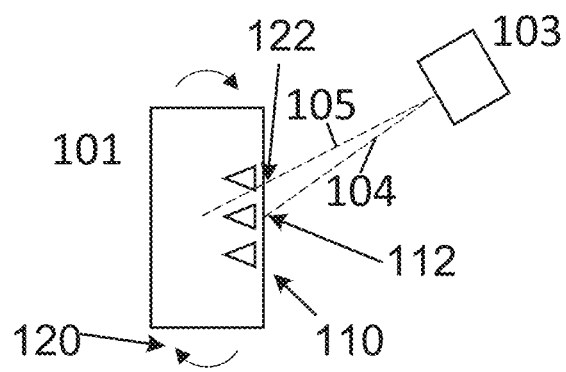
FIG. 1C is another view of the radar calibration system and target of FIG. 1B.

FIGS. 1B and 1C illustrate an exemplary calibration system for a radar system. As discussed herein, the calibration system and radar system is first installed in a temporary installation. While in the temporary installation, the calibration system records calibration measurements. The calibration system is capable of recording a series of calibration measurements. Henceforth, an exemplary "measured channel response" refers to the data from these calibration measurements. As illustrated in FIGS. 1B and 1C, a radar 101 is mounted on top of an adjustable gimbal mount platform (hereinafter a "platform") 120. The platform 120 is configured to rotate in one or both of azimuth (x-axis) and elevation (y-axis). The radar 101 is configured to transmit a signal to a reflecting object 103. FIGS. 1B and 1C illustrate a signal traversal path 104 extending from an array center 112 of an antenna array 110 to the reflecting object 103, while an expected path 105 is illustrated from the platform's rotation center 122 to the reflecting object 103. The deviance in angle between the signal traversal path 104 and the expected path 105 causes a phase shift between the expected signal 105 and the actual reflected signal 104, as well as an error in the angle of arrival. This deviance is referred to as nodal displacement, and the phase shift is modeled as a direction dependent phase variation. Nodal displacement occurs for multiple of reasons. First, the height of the radar 101 on the platform 120 may not exactly match the plane of the nodal point of rotation. Second, the nodal point may not exactly match the virtual center of the antenna array. The radar 101 may also have multiple antenna configurations with different virtual centers, and physical relocation of the radar system 101 may not be feasible. Last, there can be an error in estimating the correct nodal point.

FIG. 2 illustrates an exemplary radar/calibration system 201 which records calibration measurements while the radar/calibration system 201 is installed in a final platform or rotatable gimbal (the "platform") 220. As illustrated in FIG. 2, the radar/calibration system 201 is mounted in the platform 220. A reflecting object 203 is positioned in front of the radar/calibration system 201. FIG. 2 illustrates a signal traversal path 204 extending from an array center 212 of an antenna array 210 of the radar 201 to a reflecting object 203. An expected path 205 is also illustrated extending from the rotation axis 222 of the platform 220 to the reflecting object 203. Rotation is achieved by the mechanics of the platform 220 itself. As in the previous paragraph, a direction dependent phase variation occurs due to nodal displacement when the rotation axis 222 of the platform 220 does not match the array center 212 of the antenna array 210.

Figure 3A:
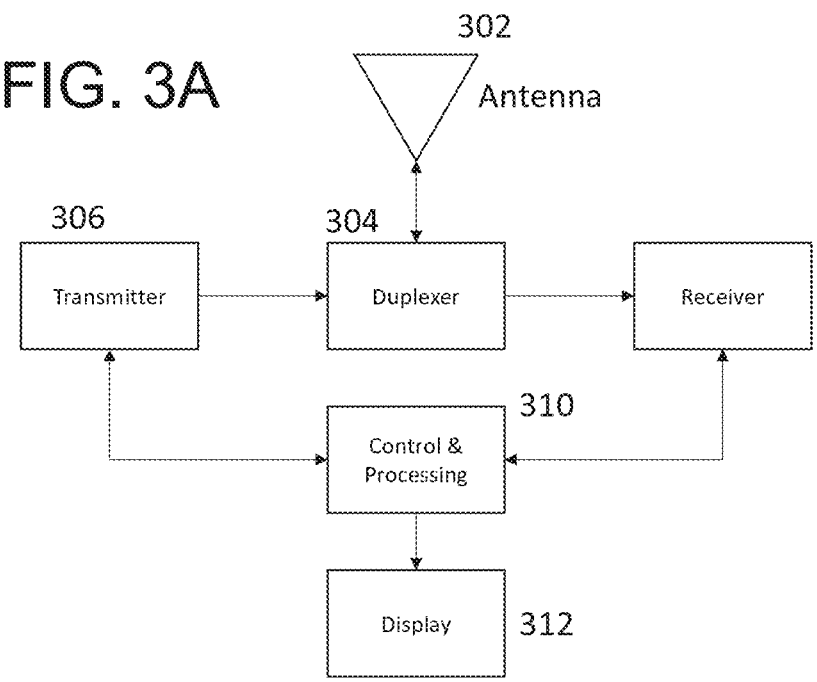
FIG. 3A and FIG. 3B are block diagrams of radar systems that use the calibration system in accordance with the present invention.

FIG. 3A illustrates an exemplary radar using the calibration method and calibration system described in the current invention with at least one antenna 302 that is time-shared between at least one transmitter 306 and at least one receiver 308 via at least one duplexer 304. Output from the receiver(s) 308 is received by a control and processing module 310 that processes the output from the receiver(s) 308 to produce display data for the display 312. The control and processing module 310 is also operable to produce a radar data output that is provided to other control and processing units. The control and processing module 310 is also operable to control the transmitter(s) 306 and the receiver(s) 308.

Figure 3B:
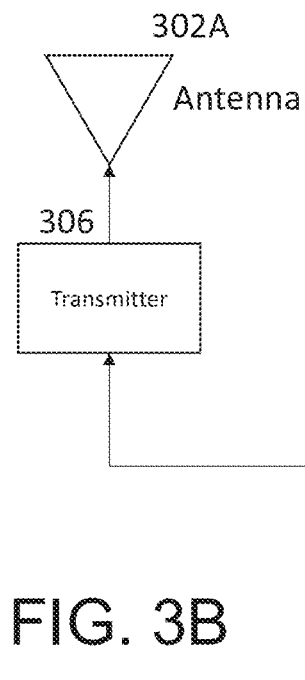

FIG. 3B illustrates an alternative exemplary radar using the calibration method and system described in the current invention with separate sets of transmitter and receiver antennas. As illustrated in FIG. 3B, at least one antenna 302A for the at least one transmitter 306 and at least at least one antenna 302B for the at least one receiver 308.

Figure 4:
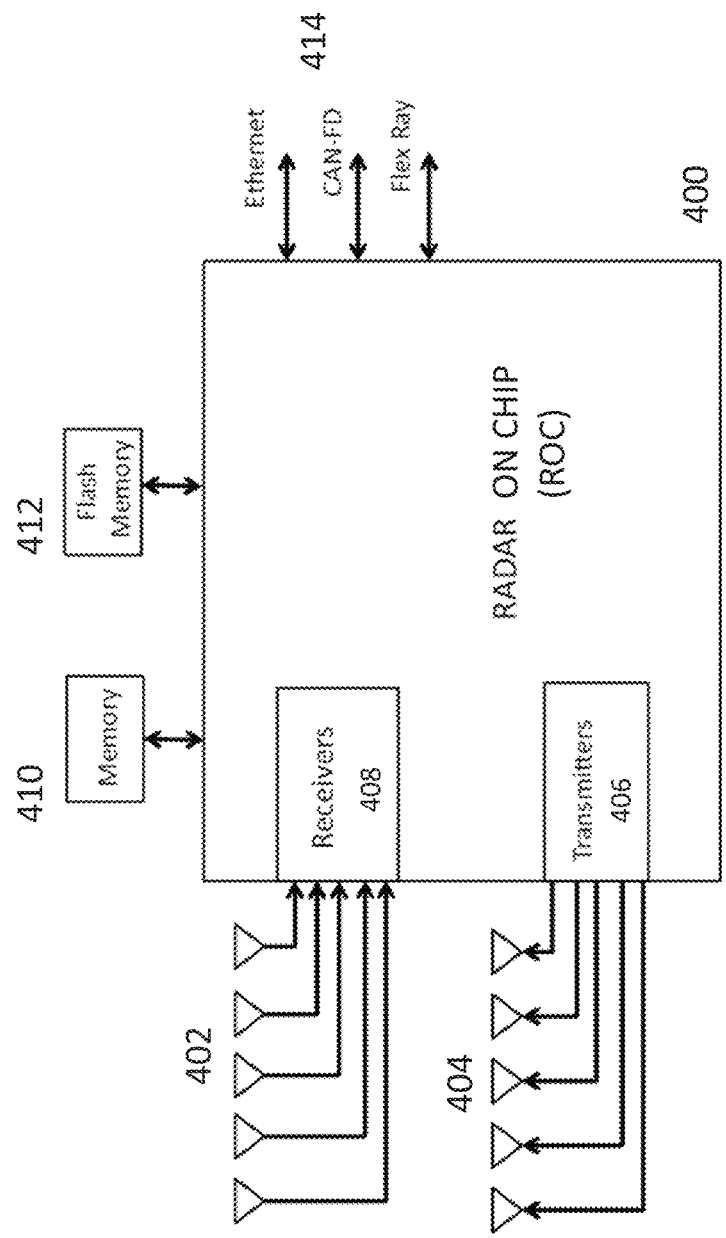
FIG. 4 is a block diagram illustrating a radar with a plurality of receivers and a plurality of transmitters (MIMO radar) that uses the calibration system in accordance with the present invention.

FIG. 4 illustrates an exemplary MIMO (Multi-Input Multi-Output) radar 400 that is configured to use the calibration method and system described herein. With MIMO radar systems 400, each transmitter signal is rendered distinguishable from every other transmitter signal by using appropriate differences in the modulation, for example, different digital code sequences. Each receiver 408 correlates with each transmitter signal, producing a number of correlated outputs equal to the product of the number of receivers 408 with the number of transmitters 406 (virtual receivers=$RX_N * TX_N$). The outputs are deemed to have been produced by a number of virtual receivers, which can exceed the number of physical receivers 408.

FIG. 4 illustrates a radar system 400 with a plurality of antennas 402 connected to a plurality of receivers 408, and a plurality of antennas 404 connected to a plurality of transmitters 406. The radar system 400 of FIG. 4 is also a radar-on-chip system 400 where the plurality of receivers 408 and the plurality of transmitters 406, along with any processing to produce radar data output and any interface (like Ethernet, CAN-FD, Flex Ray etc.), are integrated on a single semiconductor IC (Integrated Circuit). Using multiple antennas allows the radar system 400 to determine the angle of objects/targets in the environment. Depending on the geometry of the antenna system 402, 404, different angles (e.g., with respect to the horizontal or vertical) can be determined. The radar system 400 may be connected to a network via an Ethernet connection or other types of network connections 414. The radar system 400 may also include memory 410, 412 to store software used for processing the received radio signals to determine range, velocity, and location of objects/targets in the environment. Memory may also be used to store information about objects/targets in the environment.

In practice, antenna elements have a directional gain and phase response. This response varies with respect to azimuth and elevation. The combination of transmitter and receiver antenna responses can be modeled as a new virtual antenna response. This response causes a gain and phase variation from the ideal signals at the virtual receivers. This effect can be divided into a per channel gain, per channel phase, direction dependent gain, and direction dependent phase.

Figure 5:
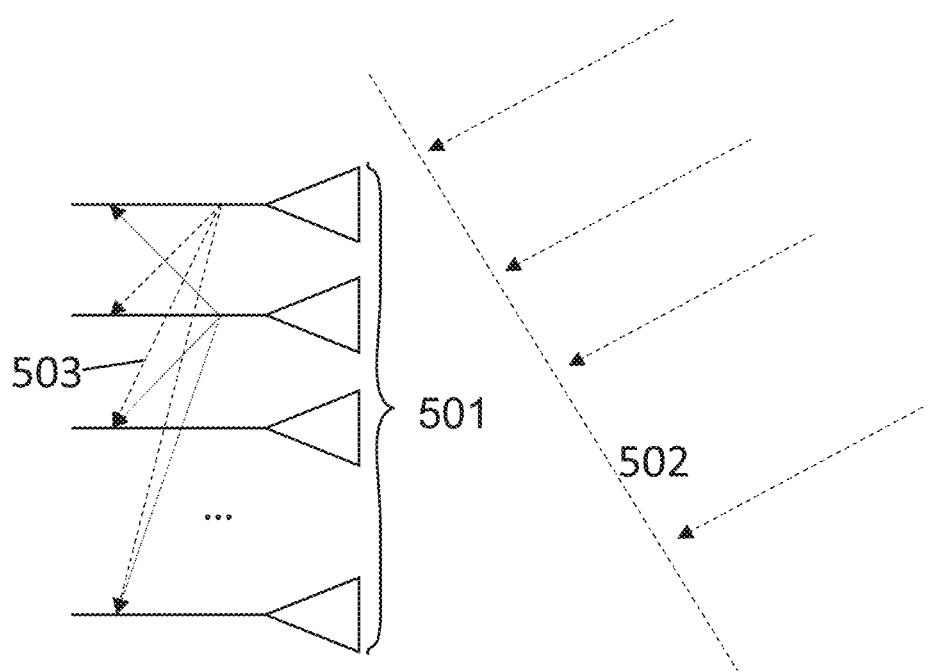
FIG. 5 is a visualization of an exemplary antenna array, an exemplary received plane wave, and exemplary coupling effects in accordance with the present invention.

In practice, leakage exists between antenna elements due to coupling effects. This coupling occurs between both the signals at the TX antenna elements and the RX antenna elements. This causes a deviation in both the signals that are transmitted by the transmitters 406 of the radar system 400 and the signals that are received by the receivers 408 of the radar system 400. The combined effect of coupling at both the transmitter and the receiver is modeled as coupling between virtual receivers. FIG. 5 illustrates the coupling in a virtual array. FIG. 5 illustrates a virtual antenna element array 501, a propagation front 502 of a far-field signal, and the path 503 of the signals to the virtual receivers. The signals at each virtual antenna element will couple. This coupling causes a gain and phase variation from the ideal signal at the virtual receivers. This impairment is henceforth referred to as mutual coupling.

In the preferred embodiment, the measured channel response is collected using a PMCW radar. Alternative embodiments may include other radar types.

Using the radar calibration systems described either in FIG. 1 or 2, one method of collecting the calibration measurements is a stop and go sweep. In this method, the radar system is rotated to the exact desired azimuth and elevation angles, where it stops before collecting the radar data. This method provides increased accuracy.

Figure 6:
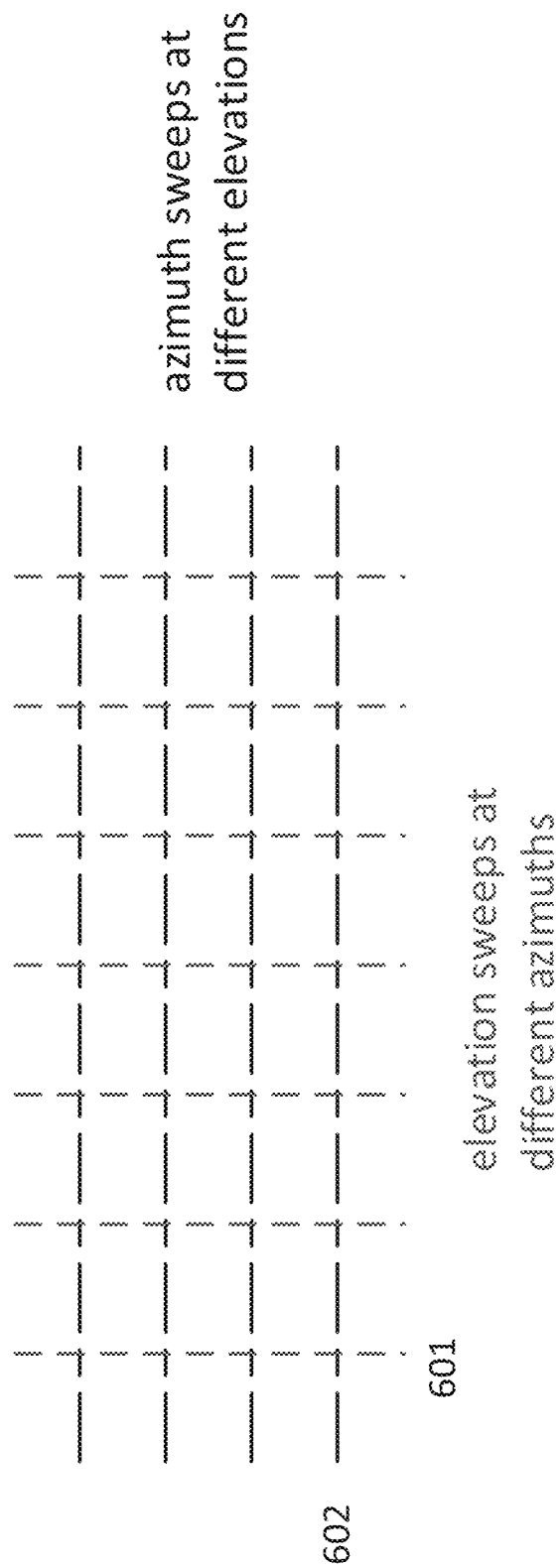
FIG. 6 is a diagram of exemplary sweep patterns executed during an exemplary measurement procedure in accordance with the present invention.

A second method of collecting the calibration measurements is a continuous sweep. In this second method, the radar system rotates in a continuous fashion and collects radar data while rotating. This method provides increased speed. However, it sacrifices accuracy due to angular smearing of the target response. There is no doppler impact since the rotation causes the effective target movement to be tangential to the radar. FIG. 6 illustrates exemplary sweep patterns. FIG. 6 illustrates azimuth sweeps 601 and elevation sweeps 602. The quantity, speed, and angular range of the sweeps is variable and chosen dependent on the array design. All sweeps contain a stationary measurement at boresight of the radar.

Figure 7:
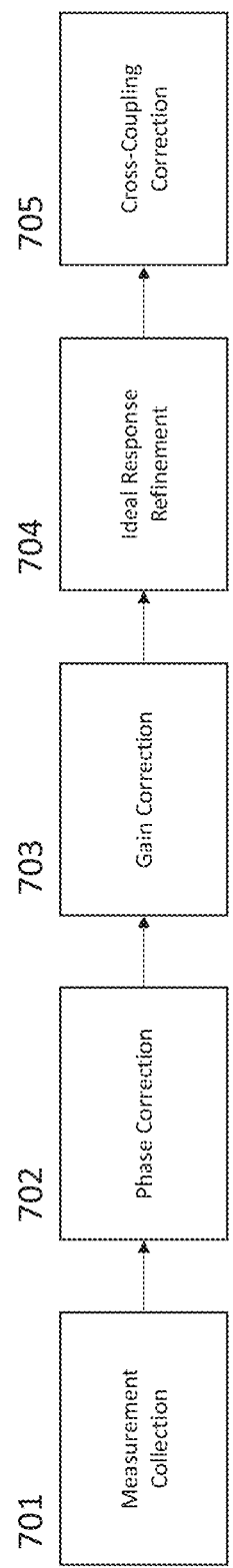
FIG. 7 is a flow chart describing the high-level processes of the calibration procedure, in accordance with the present invention.

FIG. 7 illustrates the steps to an exemplary radar system calibration procedure. In step 701, an exemplary measurement collection process is carried out. In step 702, an exemplary phase correction process is carried out, which estimates and corrects for the per channel phase variation and direction dependent phase variation in the collected data. In step 703, an exemplary gain correction process is carried out, which estimates and corrects for the per channel gain variation and direction dependent gain variation in the phase-corrected data. In step 704, an exemplary ideal response refinement process is carried out, which uses the gain- and phase-corrected data to improve the angle-of-arrival estimation for the collected radar data. In step 705, an exemplary cross-coupling calibration process is carried out, which estimates and corrects for the cross-coupling effects remaining in the gain- and phase-corrected data.

The radar data is described by the following exemplary mathematical model. Denoting az and el as the azimuth and elevation angles (in radians) to the target, define the u-v space as:

$$u = \sin(az)\cos(el)$$

$$v = \sin(el)$$

Assuming a planar antenna array where the $k^{th}$ (out of $N_{vrx}$) virtual antenna is located at $(0, dy_k, dz_k)$ in rectangular coordinates, the ideal receive data in the absence of any cross-coupling and no gain/phase variation is given by:

$$y_{ideal}(k, u, v) = e^{-j\frac{2\pi}{\lambda}(dy_k u + dz_k v)}$$

This ideal response of the $N_{vrx}$ virtual antennas corresponding to a far-field target in the u and v (or equivalently in az and el) space is expressed in vector form as:

$$\vec{y}_{ideal}(u,v) = [y_{ideal}(0,u,v), y_{ideal}(1,u,v), \ldots, y_{ideal}(N_{vrx}-1,u,v)]^T$$

In the presence of cross-coupling, the received signal vector is $\vec{x} = A\vec{y}_{ideal}$, where $A = \{\alpha_{m,k}\}$, $0 \leq m \cdot k \leq N_{vrx}-1$ is a matrix that captures both coupling and per channel gain and phase variation. With this impairment, the received data becomes:

$$x(k, u, v) = \sum_{m=0}^{N_{vrx}-1} \alpha_{m \cdot k} e^{-j\frac{2\pi}{\lambda}(dy_m u + dz_m v)}$$

The vector representation of the channel response $\vec{x}(u,v)$ is then:

$$\vec{x}(u,v) = [x(0,u,v), x(1,u,v), \ldots, x(N_{vrx}-1,u,v)]^T$$

The data model described above applies to a far-field target. The embodiments of the method and calibration system discussed herein equally applies to a near-field target as well with a corresponding modification of the signal vectors defined above. The data model can be updated for non-nodal displacement for the radar in the data collection setup as follows:

$$x_{meas}(k, u, j) = \gamma(u, v) \sum_{m=0}^{N_{vrx}-1} \alpha_{m \cdot k} e^{-j\frac{2\pi}{\lambda}(dy_m(u-\delta u(u,v)) + dz_m(v-\delta v(u,v)))}$$

Here, $\gamma(u,v)$ is due to the angle dependent phase correction (e.g., as a result of nodal displacement). $\delta u(u,v)$ and $\delta v(u,v)$ represent the angle dependent (hence the notation that these parameters are dependent on the angle of incidence as well) mismatch between the expected direction and the actual sampled direction.

The vector representation $\vec{x}_{meas}(u,v)$ is:

$$\vec{x}_{meas}(u,v) = [x_{meas}(0,u,v), x_{meas}(1,u,v), \ldots, x_{meas}(N_{vrx}-1,u,v)]^T$$

or $$\vec{x}_{meas}(u,v) = \gamma(u,v) A \vec{y}_{ideal}(u-\delta u(u,v), v-\delta v(u,v))$$

FIG. 8 illustrates an exemplary calibration procedure for direction dependent phase variation and per channel phase variation. In step 801, the estimates of the direction dependent phase variation and per channel phase variation are initialized to zero. Then, in step 802, a correction term is computed as the normalized complex conjugate of the measured channel response at boresight of the radar system. Then an iterative procedure begins. In step 803, the direction dependent phase variation is estimated using least-squares to minimize the difference between the corrected channel response and the ideal channel response. In step 804, the channel response is corrected again with this phase. Next in step 805, the per channel phase variation is estimated using least-squares to minimize the difference between the corrected channel response and the ideal channel response, now across all directions. In step 806, the channel response is corrected again with this phase. This iterative procedure is repeated for a fixed number of iterations or until convergence.

This phase calibration procedure can be described mathematically using the previous exemplary signal model. The initial coupling matrix in step 802 is set to zeros, except for the diagonal elements which are initially set to $$\alpha_{k,k}^{brs} = \frac{x_{meas}^*(k,0,0)}{|x_{meas}(k,0,0)|}$$

since $x_{meas}(k,0,0)$ is the channel measured at boresight on the $k^{th}$ virtual element. Accordingly with step 801 and step 802, we now initialize the following terms: direction dependent phase term: $\angle \tilde{\gamma}^0(u,v)=0$, per channel phase term: $\angle \tilde{\alpha}_{k,k}^0=0$, and the array response corrected for the direction dependent and per channel phase terms $\tilde{x}^0(k,u,v) = \alpha_{k,k}^{brs} x_{meas}(k,u,v)$. Then the iterative procedure begins. The superscript it is the iteration index. The direction-dependent least squares solution, $\angle \tilde{\gamma}^{it}(u,v)$, in step 803 is obtained by minimizing the cost function below:

$$C_{1,phase}(u,v) = \sum_{k=0}^{N_{vrx}-1} \left| y_{ideal}(k,u,v) e^{-j\angle \tilde{\gamma}^{it}(u,v)} - \tilde{x}^{it-1}(k,u,v) \right|^2$$

The radar data is then updated in step 804 as $$\tilde{x}^{it}(k,u,v) = \tilde{x}^{it-1}(k,u,v) e^{j\angle \tilde{\gamma}^{it}(u,v)}$$

The per channel least squared solution, $\angle \tilde{\alpha}_{k,k}^{it}$, in step 805 is obtained by minimizing the cost function below $$C_{2,phase}(k) = \sum_{u,v} \left| y_{ideal}(k,u,v) e^{-j\angle \tilde{\alpha}_{k,k}^{it}} - \tilde{x}^{it}(k,u,v) \right|^2$$

The radar data is then updated in step 806 as $$\tilde{x}^{it}(k,u,v) = \tilde{x}^{it}(k,u,v) e^{j\angle \tilde{\alpha}_{k,k}^{it}}$$

This procedure loops for a finite number of iterations. Let the number of iterations be L. At the end of iterations, we obtain the following information: updated virtual array response (corrected for phase which corrects for nodal displacement as well as phase response per angle) $\tilde{x}(k,u,v)=\tilde{x}^L(k,u,v)$, estimate of direction dependent phase correction $$\angle \tilde{\gamma}(u,v) = \sum_{it=1}^{L} \angle \tilde{\gamma}^{it}(u,v),$$

and estimate of per channel phase variation $$\angle \tilde{\alpha}_{k,k} = \sum_{it=1}^{L} \angle \tilde{\alpha}_{k,k}^{iL}.$$

FIG. 9 illustrates an exemplary calibration procedure for direction dependent gain variation and per channel gain variation. First in step 901, the estimates of the direction dependent gain and per channel gain are initialized to unity. The corrected channel response after the phase correction is now used. Then an iterative procedure begins. In step 902, the direction dependent gain is estimated using least-squares to minimize the difference between the corrected channel response and the ideal channel response. Note that the ideal channel response is unity across all virtual receivers. In step 903, the channel response is corrected with this gain. Next in step 904, the per channel gain is estimated using least-squares to minimize the difference between the corrected channel response and the ideal channel response, now across all directions. In step 905, the channel response is corrected again with this gain. This iterative procedure is repeated for a fixed number of iterations or until convergence.

This gain calibration procedure can be described mathematically using the previous exemplary signal model. Accordingly, with step 901, the following terms are initialized: direction dependent amplitude term: $|\tilde{\gamma}^0(u,v)|=1$, per channel amplitude term: $|\tilde{\alpha}_{k,k}^0|=1$, and the array response as corrected at the output of the previous phase calibration stage $\tilde{x}^0(k,u,v)=\tilde{x}(k,u,v)$. Then the iterative procedure begins. The direction-dependent least-squares solution, $|\tilde{\gamma}^{it}(u,v)|$, in step 902, is obtained by minimizing the cost function below:

$$C_{1,gain}(u,v) = \sum_{k=0}^{N_{vrx}-1} \left| |y_{ideal}(k,u,v)||\tilde{\gamma}^{it}(u,v)| - \|\tilde{x}^{it-1}(k,u,v)\| \right|^2$$

The radar data is then updated in step 903 as:

$$\tilde{x}^{it}(k,u,v) = \tilde{x}^{it-1}(k,u,v)|\tilde{\gamma}^{it}(u,v)|$$

The per channel least-squares solution, $|\tilde{\alpha}_{k,k}^{it}|$, in step 904 is obtained by minimizing the cost function below $$C_{2,gain}(k) = \sum_{u,v} \left| |y_{ideal}(k,u,v)||\tilde{\alpha}_{k,k}^{it}| - \tilde{x}^{it}(k,u,v) \right|^2$$

The radar data is then updated in step 905 as:

$$\tilde{x}^{it}(k,u,v) = \tilde{x}^{it}(k,u,v)|\tilde{\alpha}_{k,k}^{it}|$$

This procedure loops for a finite number of iterations. Let the number of iterations be L. At the end of iterations, we obtain the following information: updated virtual array response (corrected for direction dependent phase which corrects for nodal displacement as well as amplitude/phase response per angle) $\tilde{x}(k,u,v)=\tilde{x}^L(k,u,v)$, an estimate of direction dependent amplitude correction, $|\tilde{\gamma}(u,v)|=\Pi_{it=1}^{L}|\tilde{\gamma}^{it}(u,v)|$, and an estimate of per channel amplitude variation $|\tilde{\alpha}_{k,k}|=\Pi_{it=1}^{L}|\tilde{\alpha}_{k,k}^{it}|$.

The total per channel gain and phase correction terms are combined into a matrix, which is referred to as the diagonal antenna correction matrix. Using the exemplary mathematical model, this diagonal antenna correction matrix is defined as:

$$\tilde{A}_d^{-1} = \text{diag}\{|\tilde{\alpha}_{k,k}|e^{\angle \tilde{\alpha}_{k,k}}\}, 0 \leq k \leq N_{vrx}-1$$

In an embodiment of the method and calibration system discussed herein, the ideal channel response can be refined to correct for setup error and nodal displacement error after the diagonal antenna correction. The MUSIC algorithm is used, which exploits knowledge of the number of objects to provide a super-resolution estimate of the actual object directions in each measurement. These directions are then used to recompute the ideal channel response. This refined ideal channel response is used during the cross-coupling calibration process.

FIG. 10 illustrates the calibration procedure for cross-coupling. First in step 1001, a cross coupling estimate matrix is initialized to zeros. Then in step 1002, a virtual channel is selected. In step 1003, a list of retired cross channels is initialized to empty. Then in step 1004, the measured response of the selected virtual channel is projected onto the ideal response for all cross channels. In step 1005, the cross channel that corresponds to the maximum of the projection and is not yet retired is selected. The value of this projection is also recorded. In step 1006, the contribution of the selected cross channel is removed from the measured response of the selected virtual channel. In step 1007, if the contribution is greater than a given threshold, the cross-coupling matrix element corresponding to the selected virtual channel and the selected cross channel is set to the recorded projection value in step 1008. Then in step 1009, the selected cross channel is retired. The process repeats at the projection in step 1004. If the contribution was not greater than a given threshold in step 1007, then the process repeats at the virtual channel selection in step 1002 with the next virtual channel. This iterates until the process has completed for all virtual channels, as shown by step 1010. In step 1011, the cross-coupling matrix is then normalized by multiplying by the square root of the number of virtual antennas divided by the L2 norm squared of the diagonal elements of the cross-coupling matrix. The cross-coupling correction matrix is then estimated using the inverse of this cross-coupling matrix.

This cross-coupling calibration procedure can be described mathematically using the previous exemplary signal model. First in step 1001, the cross-coupling matrix $\tilde{A}_c = 0_{N_{vx} \times N_{vrx}}$ is initialized. Then the iterative procedure begins for each virtual channel. In step 1002, the index of the current virtual channel is denoted as k. In step 1003, initialize the list of retired cross channels S={ } is initialized. The projection of the k virtual channel response onto the ideal response for all cross channels in step 1004 is given by:

$$\beta_{k,m} = \Sigma_{u,v} \tilde{x}(k,u,v) y_{ideal}(m,u,v), 0 \leq m \leq N_{vrx} - 1$$

Then in step 1005, the channel, $m_{max}$, with the largest of $\beta_{k,m}$, is found as:

$$m_{max} = \underset{m \notin S}{\arg\max} |\beta_{k,m}|$$

If this is the first iteration, $|\beta_{k,m_{max}}|$ is recorded as the largest coupling value, $\beta_{max}$. In this implementation of the algorithm, these values are used in the thresholding function in step 1007. Then in step 1006, the contribution to the measured channel response is removed from the selected cross-channel from above as:

$$\tilde{x}(k,u,v) = \tilde{x}(k,u,v) - y_{ideal}(m_{max}, u, v)\beta_{k,m_{max}}$$

In step 1007, if the ratio between $|\beta_{k,m_{max}}|$ and $\beta_{max}$ exceeds a certain threshold, $Th_{cpl}$, $m_{max}$ is added to S in step 1009, and $\tilde{A}_c(k,m_{max})$ is set to $\beta_{k,m_{max}}$ in step 1008, and then the process goes to the projection in step 1004. If the threshold test in step 1007 fails, the search for the $k^{th}$ virtual channel is ended when the next virtual channel is repeated at step 1002. Once the iterations are completed over all the virtual channels as indicated by step 1010, the estimated cross-coupling matrix is normalized in step 1011 as follows:

$$\tilde{A}_c = \frac{\sqrt{N}}{\|\text{diag}(\tilde{A}_c)\|_2^2} \tilde{A}_c$$

A final correction matrix is computed through matrix multiplication of the cross-coupling correction matrix and the diagonal antenna correction matrix. Using the previous exemplary signal model, this correction matrix is defined mathematically as $\tilde{C} = A_c^{-1} \tilde{A}_d^{-1}$. This final correction matrix is implemented into the radar processing. The vector of data received at the virtual receivers is multiplied by this correction matrix before being multiplied by a steering matrix to achieve the calibrated beamformed output. The steering matrix is a stack of steering vectors, whose elements correspond to the desired complex beamforming weights. In the preferred embodiment, these vectors are the complex conjugate of the ideal channel response for the antenna array at a desired set of directions.

Thus, the exemplary embodiments discussed herein provide for the calibration of a radar system that corrects or adjusts for a misalignment between an array center of an antenna array of the radar system and a rotation center of the radar system via a platform of a calibration module that rotates the radar system in both azimuth and elevation. The calibration module calculates a misalignment between the array center of the antenna array and the rotation center of the radar system. At least one receiver of the radar system corrects for phase distortion and angle-of-arrival error due to the calculated misalignment. The misalignment between the array center of the antenna and the rotation center of the platform is a nodal displacement.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar system configured to calibrate for system impairments, wherein the radar system comprises:
   a transmitter configured to transmit radio signals;
   a receiver configured to receive radio signals that include radio signals transmitted by the transmitter and reflected from objects in an environment, wherein the transmitter and the receiver are coupled to an antenna array;
   a calibration module comprising a platform configured to rotate the receiver and the transmitter in both azimuth and elevation, wherein an array center of the antenna array is not aligned with the platform's rotation center;
   wherein, in the presence of at least one object, the calibration module is operable to collect from the receiver reflected signals from the at least one object at desired angles of interest in azimuth and elevation, wherein the calibration module is operable to calculate a misalignment value for a misalignment between the array center of the antenna array and the rotation center of the platform, and wherein the receiver is operable to correct for phase distortion and angle-of-arrival error due to the misalignment based upon the calculated misalignment value.

2. The radar system of claim 1, wherein the misalignment between the array center of the antenna array and the rotation center of the platform is a nodal displacement, and wherein the array center of the antenna array is a nodal point.

3. The radar system of claim 2, wherein the calibration module is operable to process the phase distortion and angle-of-arrival error measurements into a correction matrix to calibrate for transmitter and/or receiver impairments which include at least one of phase error due to nodal displacement, per channel phase variation, direction dependent phase variation, per channel amplitude variation, direction dependent amplitude variation, and channel response cross-coupling.

4. The radar system of claim 3, wherein the receiver is operable to estimate the angles-of-arrival of the collected reflected signals or to determine the angles-of-arrival of the collected reflected signals based upon prior knowledge of the at least one object's location relative to the receiver.

5. The radar system of claim 3, wherein the calibration module is operable to modify its measurement, collection, and calibration processing to optimize different objective functions including at least one of speed and manner of rotation, quantity of measurements collected, and the selection of antenna(s) and channel(s) transmitting and receiving the signals, and wherein these modifications also include parameters in the processing that controls the computation of the correction matrix and affect the processing speed and correction accuracy.

6. The radar system of claim 3, wherein the phase error and the amplitude variation are solved via an iterative least squares optimization solution.

7. The radar system of claim 1, wherein the platform is configured to rotate in either a continuous manner or in discrete steps.

8. The radar system of claim 1, wherein the receiver is configured to receive radio signals that include radio signals transmitted by other radar systems.

9. The radar system of claim 1 further comprising a plurality of receivers, each configured to receive radio signals that include radio signals transmitted by the transmitter and reflected from the objects in the environment, wherein each receiver of the plurality of receivers is coupled to the antenna array.

10. The radar system of claim 1 further comprising a plurality of transmitters, wherein the receiver is configured to receive radio signals that include radio signals transmitted by the plurality of transmitters and reflected from the objects in the environment, and wherein each transmitter of the plurality of transmitters is coupled to the antenna array.

11. The radar system of claim 1 further comprising a plurality of transmitters and a plurality of receivers, wherein the plurality of receivers are each configured to receive radio signals that include radio signals transmitted by the plurality of transmitters and reflected from the objects in the environment, and wherein the plurality of transmitters and the plurality of receivers are coupled to the antenna array.

12. The radar system of claim 1 further comprising an antenna switch, wherein the antenna array comprises multiple antennas, and wherein the transmitter and the receiver are coupled to the multiple antennas via the antenna switch.

13. A method for calibrating a radar system for system impairments, wherein the method comprises:
transmitting, with a transmitter, radio signals;
receiving, with a receiver, radio signals that include radio signals transmitted by the transmitter and reflected from objects in an environment;
wherein the a transmitter and the a receiver are coupled to an antenna array;
rotating, with a platform, the receiver and the transmitter in both azimuth and elevation, and wherein an array center of the antenna array is not aligned with the platform's rotational center;
in the presence of at least one object, collecting from the receiver, with a calibration module, reflected signals from the at least one object at desired angles of interest in azimuth and elevation, calculating a misalignment value for a misalignment between the array center of the antenna array and the rotation center of the platform, and
correcting, with the receiver, for phase distortion and angle-of-arrival error due to the misalignment based upon the misalignment value, wherein the misalignment between the array center of the antenna and the rotation center of the platform is a nodal displacement, and wherein the array center of the antenna array is a nodal point.

14. The method of claim 13 further comprising processing the phase distortion and angle-of-arrival error measurements into a correction matrix to calibrate for transmitter and/or receiver impairments, which include at least one of phase error due to nodal displacement, per channel phase variation, direction dependent phase variation, per channel amplitude variation, direction dependent amplitude variation, and channel response cross-coupling.

15. The method of claim 13 further comprising estimating, with the receiver, the angles-of-arrival of the collected reflected signals or determining the angles-of-arrival of the collected reflected signals based upon prior knowledge of the at least one object's location relative to the receiver.

16. The method of claim 13 further comprising modifying the calibration module's measurement, collection, and calibration processing to optimize different objective functions including at least one of speed and manner of rotation, quantity of measurements collected, and the selection of antenna(s) and channel(s) transmitting and receiving the signals, and wherein these modifications also include parameters in the processing that controls the computation of the correction matrix and affect the processing speed and correction accuracy.

17. The method of claim 13 further comprising solving the phase error and amplitude variation via an iterative least squares optimization solution.

18. The method of claim 13, wherein the platform is rotated in either a continuous manner or in discrete steps.

19. The method of claim 13 further comprising receiving, with the receiver, radio signals that include radio signals transmitted by other radar systems.

20. The method of claim 13 further comprising a plurality of transmitters and a plurality of receivers, and wherein the plurality of transmitters and the plurality of receivers are coupled to the antenna array.

* * * * *

UNITED STATES PATENT AND TRADEMARK OFFICE
CERTIFICATE OF CORRECTION

PATENT NO. : 11,953,615 B2
APPLICATION NO. : 17/147914
DATED : April 9, 2024
INVENTOR(S) : Murtaza Ali et al.

Page 1 of 2

It is certified that error appears in the above-identified patent and that said Letters Patent is hereby corrected as shown below:

In the Specification

Column 8
Line 50, "(k,u,j)" should be --(k,u,v)--

Column 9
Line 33, "$\angle \tilde{a}_{k,k}{}^0 = 0$" should be --$\angle \tilde{a}_{k,k}^0 = 0$--

Lines 34-35, "$\tilde{x}^0 (k, u, v) = a_{k,k}{}^{brs} x_{meas}(k, u, v)$" should be
--$\tilde{x}^0(k, u, v) = a_{k,k}^{brs} x_{meas}(k, u, v)$--

Line 46, "$\angle \tilde{a}_{k,k}{}^{it}$," should be --$\angle \tilde{a}_{k,k}^{it}$,--

Line 55, "$\tilde{x}^{it}(k, u, v) = \tilde{x}^{it}(k, u, v)e^{j\angle \tilde{a}_{k,k}{}^{it}}$" should be
--$\tilde{x}^{it}(k, u, v) = \tilde{x}^{it}(k, u, v)e^{j\angle \tilde{a}_{k,k}^{it}}$--

Column 10
Line 4, "$\angle \tilde{a}_{k,k} = \sum_{it=1}^{L} \angle \tilde{a}_{k,k}^{iL}$" should be --$\angle \tilde{a}_{k,k} = \sum_{it=1}^{L} \angle \tilde{a}_{k,k}^{it}$--

Line 28, "$|\tilde{a}_{k,k}{}^0| = 1$" should be --$\left|\tilde{a}_{k,k}^0\right| = 1$--

Signed and Sealed this
Tenth Day of December, 2024

Katherine Kelly Vidal
*Director of the United States Patent and Trademark Office*

CERTIFICATE OF CORRECTION (continued)
U.S. Pat. No. 11,953,615 B2

Line 36, "$C_{1,gain}(u,v) = \sum_{k=0}^{N_{vrx}-1} ||y_{ideal}(k,u,v)||\tilde{y}^{it}(u,v)| ||\tilde{x}^{it-1}(k,u,v)||^2$" should be -- $C_{1,gain}(u,v) = \sum_{k=0}^{N_{vrx}-1} ||y_{ideal}(k,u,v)||\tilde{y}^{it}(u,v)| - |\tilde{x}^{it-1}(k,u,v)||^2$ --

Line 42, "$|\tilde{\alpha}_{k,k}{}^{it}|$" should be -- $|\tilde{\alpha}_{k,k}^{it}|$ --

Line 52, "$\tilde{x}^{it}(k, u, v) = \tilde{x}^{it}(k, u, v)|\tilde{\alpha}k,kit|$" should be -- $\tilde{x}^{it}(k,u,v) = \tilde{x}^{it}(k,u,v)|\tilde{\alpha}_{k,k}^{it}|$ --

Lines 58-59, "$|\tilde{y}(u,v)| = \prod_{it=1}^{L}|\tilde{y}^{it}(u,v)|$" should be -- $|\tilde{y}(u,v)| = \prod_{it=1}^{L}|\tilde{y}^{it}(u,v)|$ --

Line 60, "$|\tilde{\alpha}_{k,k}| = \prod_{it=1}^{L}|\tilde{\alpha}_{k,k}{}^{it}|$" should be -- $|\tilde{\alpha}_{k,k}| = \prod_{it=1}^{L}|\tilde{\alpha}_{k,k}^{it}|$ --